US012640571B2

(12) United States Patent
Wang et al.

(10) Patent No.: US 12,640,571 B2
(45) Date of Patent: May 26, 2026

(54) ELECTRIC TOOL AND POWER MANAGEMENT CIRCUIT

(71) Applicant: DELTA ELECTRONICS, INC., Taoyuan City (TW)

(72) Inventors: Shih-Chung Wang, Taoyuan City (TW); Cheng-Yu Shu, Taoyuan City (TW); Che-Min Chen, Taoyuan City (TW); Chien-Lung Liu, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 11 days.

(21) Appl. No.: 18/795,207

(22) Filed: Aug. 6, 2024

(65) Prior Publication Data

US 2025/0300482 A1      Sep. 25, 2025

(30) Foreign Application Priority Data

Mar. 22, 2024     (CN) .......................... 202410334536.0

(51) Int. Cl.
| | |
|---|---|
| *H02J 7/00* | (2026.01) |
| *H02J 7/06* | (2006.01) |
| *H02J 7/40* | (2026.01) |
| *H02P 23/14* | (2006.01) |

(52) U.S. Cl.
CPC .................. *H02J 7/06* (2013.01); *H02J 7/40* (2026.01); *H02J 7/855* (2026.01); *H02P 23/14* (2013.01)

(58) Field of Classification Search
CPC ........ H02J 7/06; H02J 7/00032; H02J 7/0063; H02J 7/00; H02P 23/14

USPC .......................................................... 307/35
See application file for complete search history.

(56) References Cited

U.S. PATENT DOCUMENTS

| | | | |
|---|---|---|---|
| 10,847,988 | B2 | 11/2020 | Shimura |
| 2005/0194928 | A1* | 9/2005 | Hou ...................... H02J 7/0045 |
| | | | 320/114 |
| 2017/0040822 | A1 | 2/2017 | Li et al. |
| 2017/0294789 | A1 | 10/2017 | Helenius et al. |
| 2019/0036373 | A1 | 1/2019 | Shimura |

(Continued)

FOREIGN PATENT DOCUMENTS

| | | |
|---|---|---|
| CN | 108539808 A | 9/2018 |
| CN | 210780189 U | 6/2020 |

(Continued)

*Primary Examiner* — Rexford N Barnie
*Assistant Examiner* — Xuan Ly
(74) *Attorney, Agent, or Firm* — CKC & Partners Co., LLC

(57) ABSTRACT

An electric tool is powered by a battery. An electric tool includes a motor, a charging and discharging control circuit and a motor control circuit. Charging and discharging control circuit is configured to couple to a power adapter. Charging and discharging control circuit includes a direct power supply path connected to the power adapter and battery, and is configured to detect an input current from power adapter and a first load current flowing to battery and to calculate an upper limit of a second load current that can be provided to motor according to a difference between the input current and the first load current. Motor control circuit is coupled between charging and discharging control circuit and motor, and is configured to control a speed or a torque of motor according to the upper limit of second load current.

9 Claims, 10 Drawing Sheets

(56)                        References Cited

U.S. PATENT DOCUMENTS

2020/0244079  A1      7/2020   Meacham, II et al.
2024/0297507  A1*     9/2024   Cheng ................... H01M 12/02

FOREIGN PATENT DOCUMENTS

EP          3971472  A1      3/2022
EP          3972072  B1      8/2023
JP          5085626  B2     11/2012

* cited by examiner

ELECTRIC TOOL AND POWER MANAGEMENT CIRCUIT

CROSS-REFERENCE TO RELATED APPLICATION

This application claims priority to China Application Serial Number 202410334536.0, filed Mar. 22, 2024, the disclosures of which are incorporated herein by reference in their entireties.

BACKGROUND

Field of Invention

The present disclosure relates to a technical field related to an electric tool. More particularly, the present disclosure relates to a power management circuit and an electric tool with different charging paths.

Description of Related Art

Conventional electric tool must be equipped with a DC to DC converter, which is expensive and takes up a certain proportion of an electric tool. In addition, an electric energy conversion efficiency of conventional DC to DC converter of electric tool is poor.

For the foregoing reasons, there is a need of an electric tool and a power management circuit to solve the above problems encountered in related art approaches.

SUMMARY

One aspect of the present disclosure provides an electric tool. The electric tool is powered by a battery. The electric tool includes a motor, a charging and discharging control circuit and a motor control circuit. The charging and discharging control circuit is, configured to couple to a power adapter. The charging and discharging control circuit includes a direct power supply path connected to the power adapter and the battery. The charging and discharging control circuit is configured to calculate an upper limit of a second load current that can be provided to the motor according to a difference between the input current and the first load current. The motor control circuit is coupled between the charging and discharging control circuit and the motor. The motor control circuit is configured to control a speed or a torque of the motor according to the upper limit of the second load current.

Another aspect of the present disclosure provides a power management circuit. The power management circuit is configured to supply power to a motor and a battery in an electric tool. The power management circuit includes a charging and discharging control circuit. The charging and discharging control circuit is configured to couple to a power adapter and the electric tool. The charging and discharging control circuit includes a direct power supply path connected to the power adapter and the battery. The charging and discharging control circuit is configured to detect an input current from the power adapter and a first load current flowing to the battery, and is configured to calculate an upper limit of a second load current that can be provided to the motor according to a difference between the input current and the first load current. The charging and discharging control circuit is configured to transmit the upper limit of the second load current to a motor control circuit of the electric tool so that the motor control circuit is further configured to control a speed or a torque of the motor according to the upper limit of the second load current.

The present disclosure provides a design of an electric tool and a power management circuit, which allows electronic products to be quickly charged with a specific power adapter, allows electronic products to be used when a power adapter is connected to electronic products, and pieces of internal data of electronic products can be directly read through a port of a connector.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
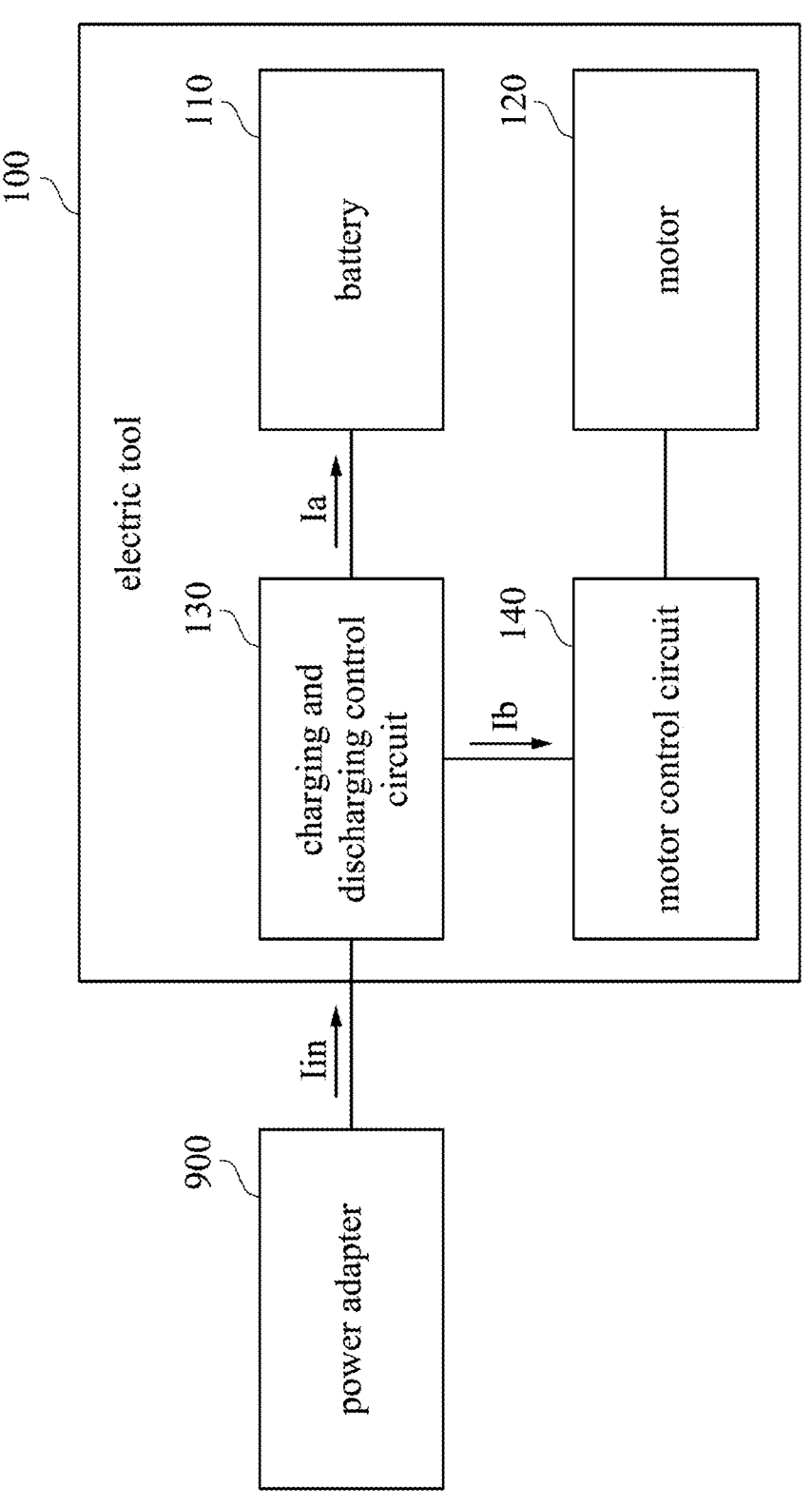
FIG. 1 depicts a schematic diagram of an electric tool and a power adapter according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a schematic diagram of an electric tool 100 and a power adapter 900 according to some embodiments of the present disclosure. The electric tool 100 includes a battery 110, a motor 120, a charging and discharging control circuit 130 and a motor control circuit 140. The battery 110 is coupled to the charging and discharging control circuit 130. The motor control circuit 140 is coupled between the motor 120 and the charging and discharging control circuit 130. In this embodiment, the battery 110 is fixedly disposed in the electric tool 100. In another embodiment, the electric tool 100 does not include the battery 110, and the battery 110 is electrically connected to the electric tool 100 in a detachable manner.

In some embodiments, the electric tool 100 is applied to products with power delivery (PD) technology. PD technology can provide different power outputs (i.e.: provide a variety of different voltages and currents) according to power needs of different devices, thereby providing faster charging speed and safer charging. For example, the electric tool 100 may be a robot, an electric machine tool, a small agricultural machine, a handheld machine tool, or other electronic product that has a battery and needs to be charged.

In some embodiments, the battery 110 can be lithium battery pack or lead-acid battery pack respectively. In some embodiments, the motor 120 can be three-phase motors, brushed motors, brushless motors or servo motors. In some embodiments, the motor control circuit 140 can be implemented as a field-oriented control (FOC) circuit or a six step square wave control circuit.

Conventional electric tool must be equipped with a DC to DC converter, which is expensive and takes up a certain proportion of an electric tool. The present disclosure designs a circuit that does not require a DC-DC converter in an electric tool to achieve lightweight, installation space and cost saving.

Figure 2:
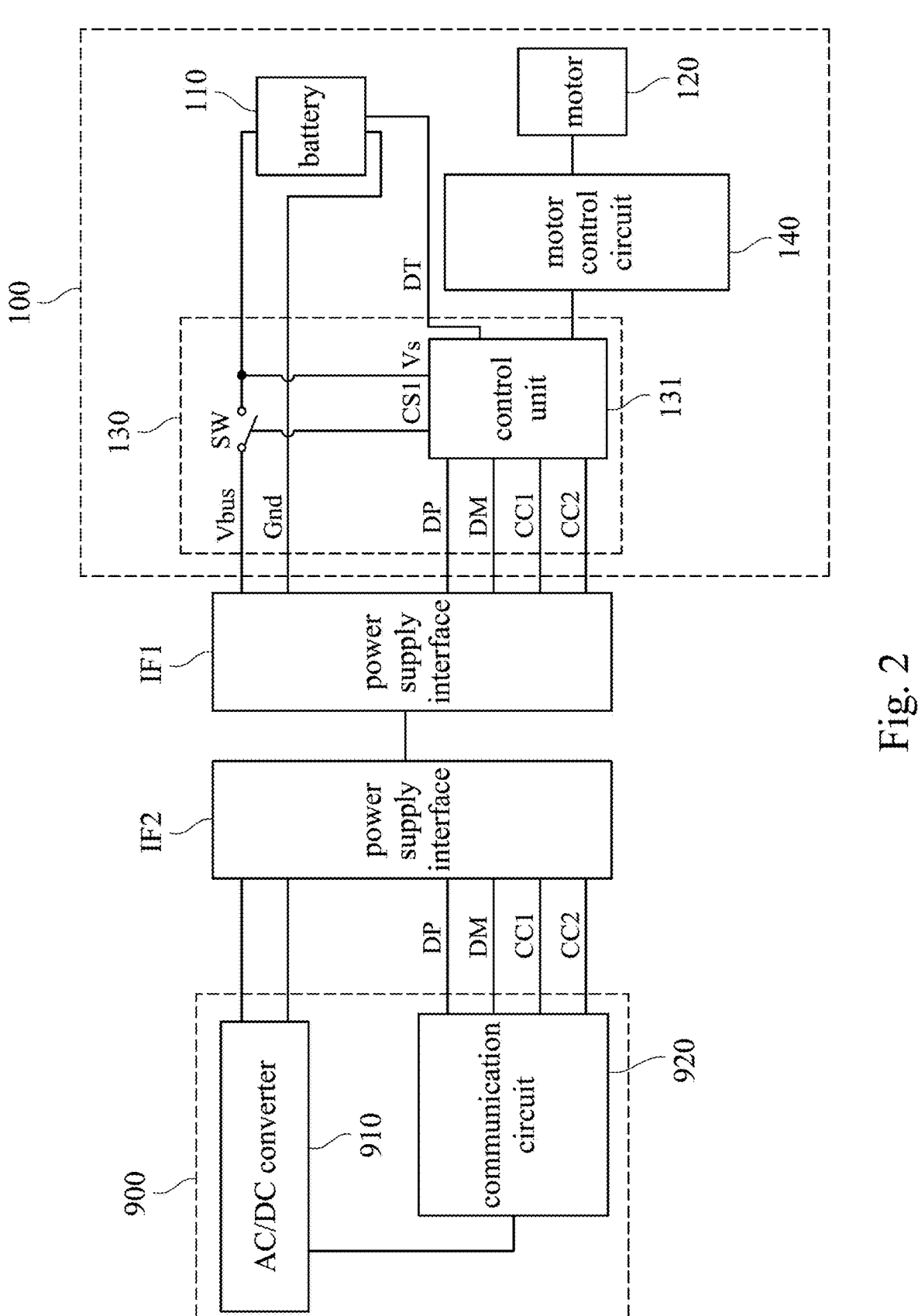
FIG. 2 depicts a schematic diagram of an internal circuit of an electric tool and a power adapter according to some embodiments of the present disclosure.

In order to facilitate the understanding of the circuit of the present disclosure and its operation, please refer to FIG. 1 and FIG. 2. FIG. 2 depicts a schematic diagram of an internal circuit of the electric tool 100 and the power adapter 900 in FIG. 1 according to some embodiments of the present disclosure. The power adapter 900 includes an AC/DC converter 910 and a communication circuit 920. The electric tool 100 is connected to a power supply interface IF2 of the power adapter 900 through a power supply interface IF1. The power supply interface IF1 and the power supply interface IF2 are implemented as USB Type-C interfaces of PD protocol. Each of the power supply interface IF1 and the power supply interface IF2 includes a data line DP, a data line DM, a channel configuration line CC1 and a channel configuration line CC2. A function of the Channel Configuration (CC) line is to configure power supply of two devices connected together. Initially, there is no power supply on a bus terminal voltage Vbus of the USB Type-C interface. System needs to define two devices during line connections. One of the two devices whose CC line on the socket is pulled up to a high potential will be defined as a power supply terminal, and the other of the two device that is pulled down to a low potential will be defined as a powered terminal.

The charging and discharging control circuit 130 includes a control unit 131 and a switch SW. One terminal of the switch SW is connected to the bus terminal and is used to receive the bus terminal voltage Vbus. Another terminal of the switch SW is connected to the battery 110. A control terminal of the switch SW is configured to conduct or turn off the switch SW according to a voltage level of the control signal CS1 of the control unit 131. In one embodiment, the control unit 131 can be implemented using a microcontroller unit (MCU) or other suitable circuit components.

When the power adapter 900 (acting as the power supply terminal at this time) is connected to the power supply interface IF1 of the electric tool 100 (acting as the powered terminal) through the power supply interface IF2, the control unit 131 of the charging and discharging control circuit 130 of the electric tool 100 is configured to detect that the two devices are connected through the channel configuration line CC1 and the channel configuration line CC2 and then executed a Standard Power Range (SPR) protocol for power transmission to confirm functions supported by both the power supply terminal and the powered terminal (e.g.: direct power supply function or voltage conversion function). Then, after the electric tool 100 and the power adapter 900 perform the SPR protocol, the control unit 131 of the charging and discharging control circuit 130 of the electric tool 100 is configured to transmit a plurality of unstructured vendor defined messages (unstructured VDM) to the power adapter 900 to confirm whether the power adapter 900 (i.e. the powered terminal) support a direct power supply mode designed by the present disclosure.

In one embodiment, the control unit 131 is configured to transmit an unstructured VDM about entering the direct power supply mode to the power adapter 900 to wait for the power adapter 900 to respond to corresponding message. If there is no response to the corresponding message, it means that the power adapter 900 does not accept the direct power supply mode.

Then, the control unit 131 is further configured to transmit an unstructured VDM about setting data of the direct power supply mode to the power adapter 900 to wait for the power adapter 900 to respond to corresponding message. If there is no response to the corresponding message, it means that the power adapter 900 does not accept the direct power supply mode.

Furthermore, the control unit 131 is configured to transmit an unstructured VDM about conducting the direct power supply mode to the power adapter 900 to wait for the power adapter 900 to respond to corresponding message. If there is no response to the corresponding message, it means that the power adapter 900 does not accept the direct power supply mode.

In aforementioned embodiments, if the power adapter 900 is configured to respond to the plurality of unstructured vendor defined messages mentioned above, it means that the power adapter 900 accepts the direct power supply mode. Detailed operation of the direct power supply mode will explained in following paragraphs. In another embodiment, the power adapter 900 is configured to send a message that the direct power supply mode is accepted. Generally a power delivery (PD) adapter supports a constant voltage output mode. When accepting the direct power supply mode, the power delivery (PD) adapter first determines whether it can support a constant current output (CCO) mode. If it is determined to support the constant current output mode, then the battery is charged by a combination of the constant current output mode and the constant voltage output mode.

Figure 3:
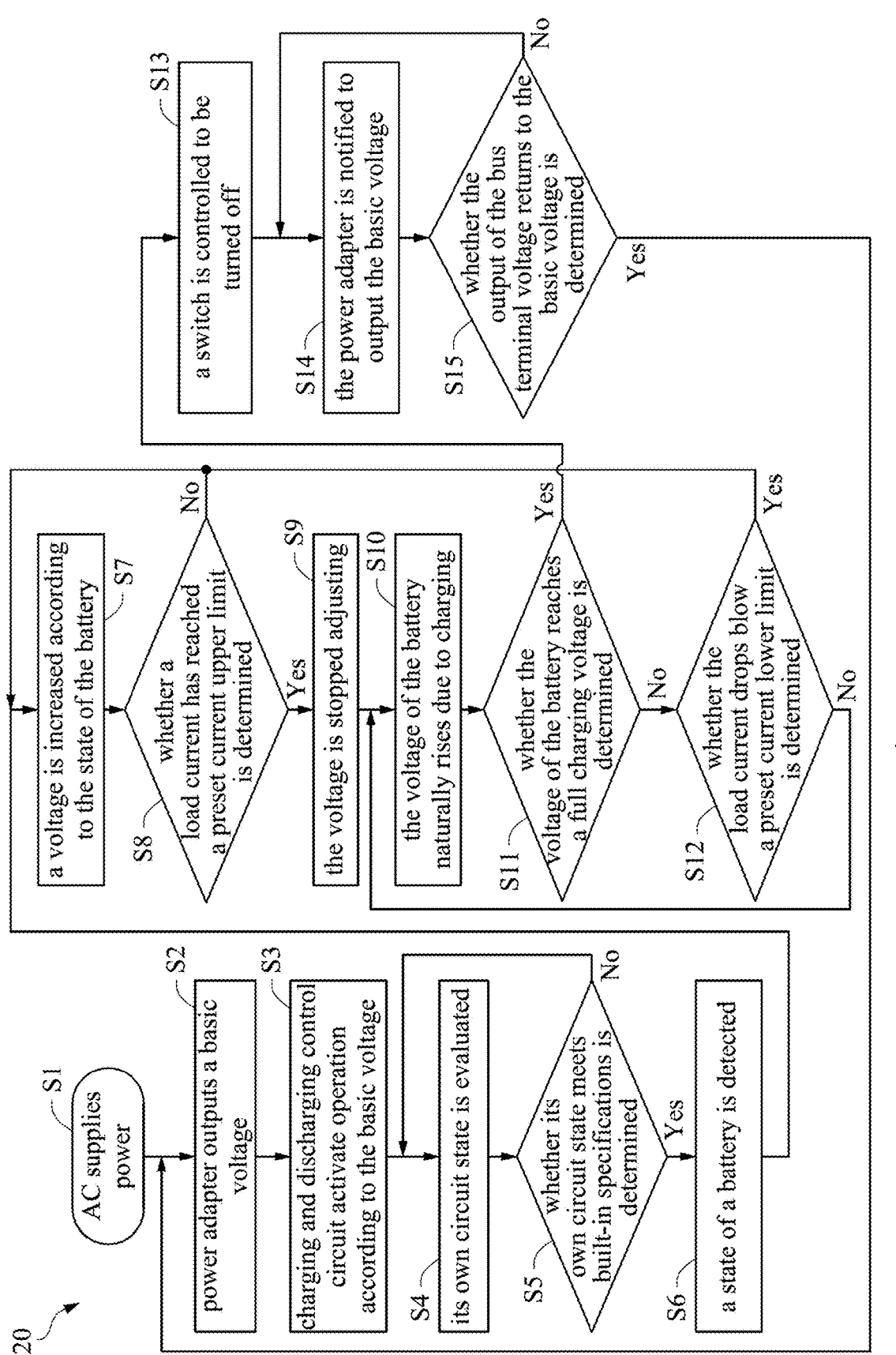
FIG. 3 depicts a flow chart of an operation process of an electric tool in a charging mode according to some embodiments of the present disclosure.
Figure 4:
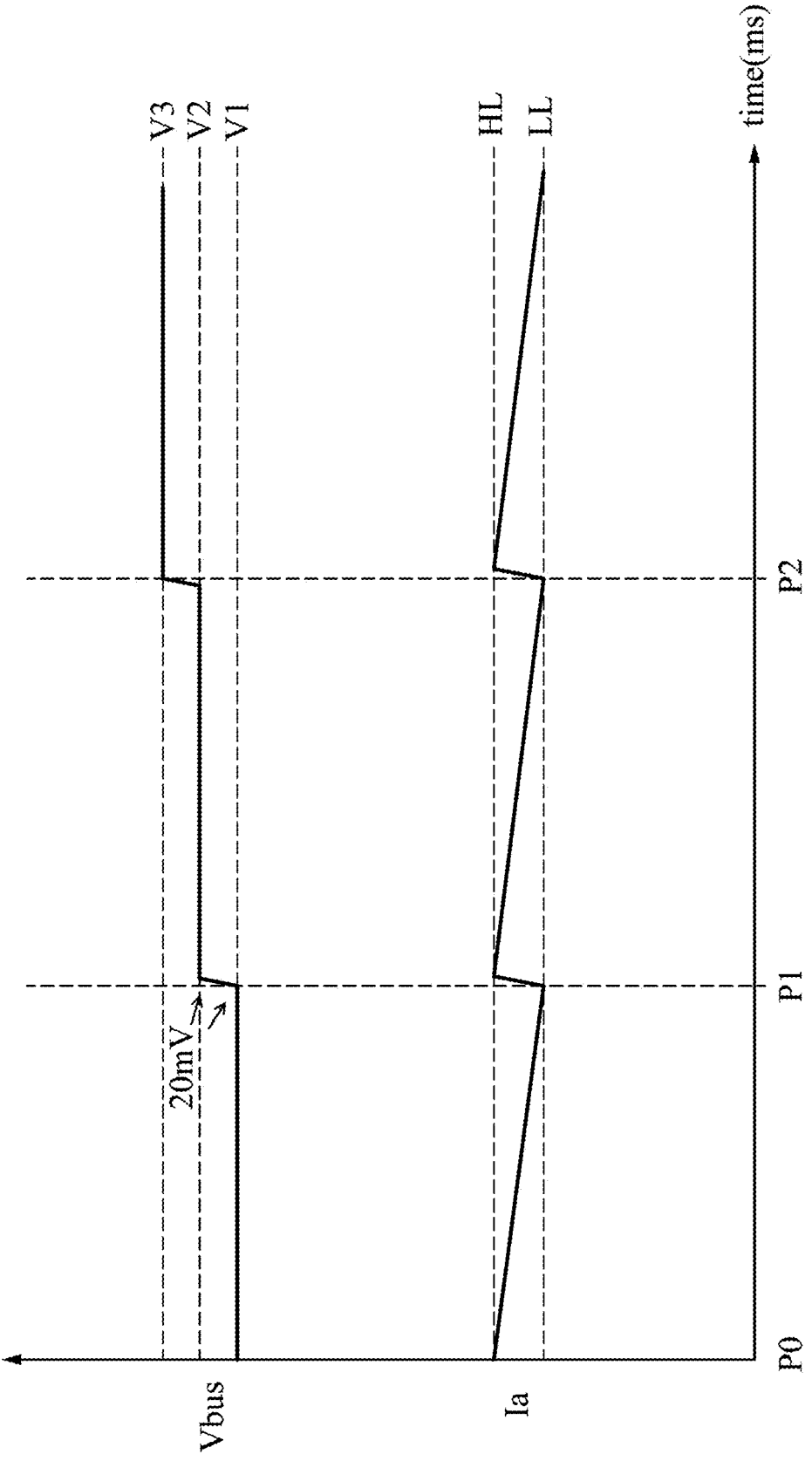
FIG. 4 depicts a schematic diagram of voltage and current changes of an electric tool in a charging mode according to some embodiments of the present disclosure.

If it is determined that the constant current output mode is not supported, the power adapter 900 operates as explained in following paragraphs. In order to facilitate the understanding an operation of the direct power supply mode, please refer to FIG. 1 to FIG. 4. FIG. 3 depicts a flow chart of an operation process 20 of the electric tool 100 in FIG. 1 in a charging mode according to some embodiments of the present disclosure. FIG. 4 depicts a schematic diagram of voltage and current changes of the electric tool 100 in FIG. 1 in a charging mode according to some embodiments of the present disclosure.

In process S1, please refer to FIG. 2, alternating current (AC) power supply (not shown in the figure) supplies power, and the AC power is converted into DC power through the AC/DC converter 910 of the power adapter 900.

In process S2, please refer to FIG. 2 and FIG. 3, the power adapter 900 (i.e. the power supply terminal) is configured to output a basic voltage (e.g.: 5 volts (V)) for a SPR protocol to the electric tool 100.

In process S3, the charging and discharging control circuit 130 of the electric tool 100 is configured to activate operation according to the basic voltage of the power adapter 900, the aforementioned SPR protocol and unstructured VDM.

In process S4, the control unit 131 of the charging and discharging control circuit 130 of the electric tool 100 is configured to evaluate its own circuit state. In process S5, the control unit 131 is configured to determine whether its own circuit state meets built-in specifications. If its own circuit state does not meet the built-in specifications, the control unit 131 is configured to execute built-in debugging programs to make its circuit state comply with built-in specifications. If its own circuit state meets the built-in specifications, the control unit 131 is configured to execute a process S6.

In process S6, please refer to FIG. 2 and FIG. 3, the control unit 131 is configured to detect a state of the battery 110 (e.g.: remaining power of the battery 110, a real-time voltage state and real-time current state of the battery 110) through the signal line Vs or a detecting line DT, to determine whether to change a voltage level of a control signal (e.g.: a control signal CS1 of the switch SW).

In process S7, please refer FIG. 1 to FIG. 4, the control unit 131 is configured to notify the power adapter 900 according to relevant results after detecting the state of the battery 110 through the channel configuration line CC1 and the channel configuration line CC2, thereby changing an output of the bus terminal voltage Vbus. When the power adapter 900 can support a programmable power supply (PPS) protocol, it allows a voltage and a current of the bus (i.e., the power supply interface IF1) to be accurately adjusted. At this time, an adjustment voltage range is between 3V to 20V. In other words, the voltage can be adjusted as low as 3V. In addition, the voltage range can be adjusted according to different design considerations. In another embodiment, an adjustment voltage range is between 5V to 48V.

For example, if the control unit 131 is configured to detect that the voltage of the battery 110 is 4 volts (V), the control unit 131 is configured to notify the power adapter 900 to generate a output voltage V1 of 4.5 volts (V) that is greater than volts (i.e. 4 V), and is configured to control the switch SW to conduct a direct power supply path (i.e. a path that passes through the power supply interface IF1, the switch SW and the battery 110 in sequence) so that a load current Ia increases. Then, the voltage of the battery 110 naturally rises due to charging.

In process S8, the control unit 131 is configured to detect whether the load current Ia has reached a preset current upper limit HL. If the load current Ia has not reached the preset current upper limit HL, the control unit 131 is configured to increase the bus terminal voltage Vbus according to the state of battery 110.

If the load current Ia has reached the preset current upper limit HL, the control unit 131 is configured to notify the power adapter 900 to stop adjusting the bus terminal voltage Vbus.

In process S9, at a time point P0, when the load current Ia reaches the preset current upper limit HL, the control unit 131 is configured to notify the power adapter 900 to maintain the voltage level of the output voltage V1.

In process S10, the voltage of the battery 110 naturally rises due to charging. In process S11, the control unit 131 is further configured to determine whether the voltage of the battery 110 reaches a full charging voltage specified by the battery 110 due to the output voltage V1.

In process S12, the control unit 131 is configured to determine that the load current Ia drops blow a preset current lower limit LL. For example, at a time point P1, the load current Ia drops below the preset current lower limit LL, the control unit 131 is further configured to notify the power adapter 900 to increase the output voltage V1 to an output voltage V2. In some embodiments, a voltage value adjusted between the output voltage V1 and the output voltage V2 is 20 millivolts (mV). The voltage value can be designed according to actual needs and is not limited to this embodiment.

At a time point P2, an adjustment method that the control unit 131 is configured to control the output voltage V2 to an output voltage V3 of the power adapter 900 is the same as an adjustment method that the output voltage V1 is adjusted to the output voltage V2 at the time point P1 described above, and repetitious detailed descriptions are omitted here.

For example, when the power adapter 900 is configured to generate the output voltage V1 of 4.5 volts (V) to charge the battery 110. As the voltage of the battery 110 slowly rises from 4V and approaches 4.5V, a voltage difference between the output voltage V1 of the power adapter 900 and the voltage of the battery 110 decreases, and the load current Ia will decreases accordingly. At this time, the control unit 131 is configured to detect that whether the load current Ia is lower than the preset current lower limit LL, and is configured to notify the power adapter 900 to increase the bus terminal voltage Vbus, for example, from 4.5V to 5V. By repeating the aforementioned processes, the control unit 131 can notify the power adapter 900 to gradually increase the bus terminal voltage Vbus in stages, such as 4.5V, 5V, 5.5V, 6V and so on until the full charging voltage of the battery is reached. A voltage difference for each increase is not limited to 0.5V and can be determined according to actual needs. On the other hand, the control unit 131 is configured to detect that whether the load current Ia is higher than the preset current upper limit HL, and notify the power adapter 900 to gradually reduce the bus terminal voltage Vbus.

In process S13, if the voltage of the battery 110 reaches the full charge voltage specified by the battery 110 due to the output voltage V1, the control unit 131 is further configured to control the switch SW to interrupt the direct power supply path (i.e. the path that passes through the power supply interface IF1, the switch SW and the battery 110 in sequence).

In process S14, when the battery 110 is fully charged, the control unit 131 is configured to notify the power adapter 900 through the programmable power protocol to output the basic voltage (e.g. 5V).

In process S15, the control unit 131 is configured to determine whether the output of the bus terminal voltage Vbus of the power adapter 900 returns to the basic voltage. If the output of the bus terminal voltage Vbus does not return to the basic voltage, the control unit 131 is configured to re-execute the process S14. If the output of the bus terminal voltage Vbus returns to the basic voltage, the process S2 is re-executed through the electric tool 100 and the power adapter 900.

In the present disclosure, the power adapter 900 is configured to support the direct power supply mode of the charging and discharging control circuit 130 of the electric tool 100 so that there is no need to add a DC-DC converter circuit to the electric tool 100 in order to achieve lightweight, installation space and cost saving.

Figure 5:
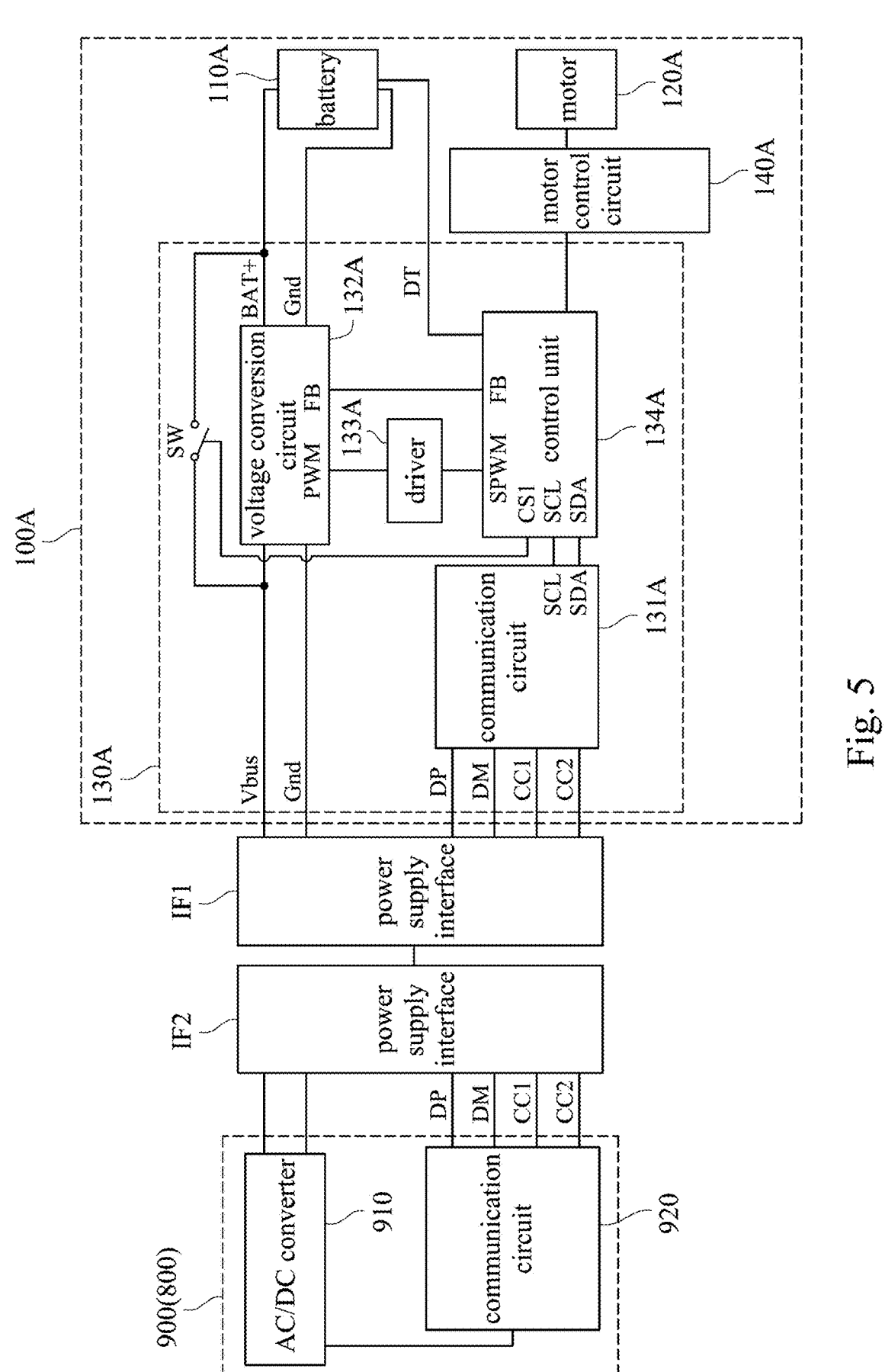
FIG. 5 depicts a schematic diagram of an internal circuit of an electric tool and a power adapter according to some embodiments of the present disclosure.

FIG. 5 depicts a schematic diagram of an internal circuit of an electric tool 100A and the power adapter 900 in FIG. 1 according to some embodiments of the present disclosure. Compared with the electric tool 100, the electric tool 100A has added a DC-DC converter related circuits to support power adapters 900 from different suppliers. At the same time, the electric tool 100A can provide a reverse power supply function.

The electric tool 100A includes a battery 110A, a motor 120A, a charging and discharging control circuit 130A and a motor control circuit 140A. The battery 110A is coupled to the charging and discharging control circuit 130A. The motor control circuit 140A is coupled to the motor 120A and the charging and discharging control circuit 130A. Connection methods and operations of the battery 110A, the motor 120A, the charging and discharging control circuit 130A and the motor control circuit 140A are respectively similar to connection methods and operations of the corresponding components in the electric tool 100 in FIG. 2. For the sake of brevity, only the differences are described below. Compared with the charging and discharging control circuit 130 in FIG. 2, the charging and discharging control circuit 130A further includes a voltage conversion circuit 132A, a driver 133A and a control unit 134A. The voltage conversion circuit 132A is coupled between the power adapter 900 and the battery 110A. The driver 133A is coupled to the voltage conversion circuit 132A. The control unit 134A is coupled to the communication circuit 131A and the driver 133A. In one embodiment, the control unit 134A can be implemented using a microcontroller unit (MCU).

The voltage conversion circuit 132A is configured to receive a pulse width modulation signal PWM generated by the driver 133A, and adjust the bus terminal voltage Vbus of the output voltage of the power adapter 900 through the voltage conversion path (i.e. the path that passes through the power supply interface IF1, the voltage conversion circuit 132A and the battery 110A in sequence) according to the pulse width modulation signal PWM to the voltage of the battery 110A. The driver 133A is configured to receive a modulation control signal SPWM, and is configured to generate the pulse width modulation signal PWM according to the modulation control signal SPWM. The control unit 134A is configured to generate the modulation control signal SPWM according to the communication signal of the communication circuit 131A and the voltage of the battery 110A.

For the electric tool 100A to support power adapters 900 from different suppliers, the communication circuit 131A of the electric tool 100A is configured to execute the aforementioned SPR protocol and unstructured VDM through the channel configuration line CC1 and the channel configuration line CC2 to confirm functional states of the electric tool 100A. In other words, when the power adapter 900 is connected to the power supply interface IF1 of the electric tool 100A through the power supply interface IF2, the communication circuit 131A is configured to learn of charging modes supported by the power adapter 900 or whether a device 800 (i.e. not the power adapter 900) is a powered terminal device through the channel configuration line CC1 and the channel configuration line CC2.

When the communication circuit 131A of the electric tool 100A confirms that the power adapter 900 can support the direct power supply mode, the communication circuit 131A of the electric tool 100A and the power adapter 900 are configured to execute the process S1 to the process S15 of the aforementioned operation process 20.

When the communication circuit 131A of the electric tool 100A confirms that the power adapter 900 cannot support the direct power supply mode, the communication circuit 131A of the electric tool 100A is configured to convert communication signals of the channel configuration line CC1 and the channel configuration line CC2 into communication signals of transmission clock signal line SCL (Serial clock line) and transmission data line SDA (Serial data line) to transmit the data transmitted by the communication signal to the control unit 134A. The control unit 134A is configured to execute built-in program to learn of voltage states and current states transmitted/converted by the voltage conversion circuit 132A through a feedback signal line FB, so as to instantly output the corresponding modulation control signal SPWM, thereby allowing the driver 133A to generate corresponding pulse width modulation signal PWM. At this time, the charging mode of the communication circuit 131A of the electric tool 100A is equivalent to entering the voltage conversion mode to drive the voltage conversion circuit 132A to convert the bus terminal voltage Vbus, thereby allowing the power adapter 900 to charge the battery 110A.

When the communication circuit 131A of the electric tool 100A confirms that the device 800 (i.e. not the power adapter 900) is the powered terminal device, the communication circuit 131A of the electric tool 100A is configured to convert the communication signals of the channel configuration line CC1 and the channel configuration line CC2 into the communication signals of the transmission clock signal line SCL and transmission data line SDA, to transmit the data transmitted by the communication signal to the control unit 134A. The control unit 134A is configured to execute built-in program to learn of voltage states and current states transmitted/converted by the voltage conversion circuit 132A through the feedback signal line FB, so as to instantly output the corresponding modulation control signal SPWM, thereby allowing the driver 133A to generate corresponding pulse width modulation signal PWM. At this time, the communication circuit 131A of the electric tool 100A is in a power supply mode to drive the voltage conversion circuit 132A to convert electrical energy of the battery 110A. At this time, in the power supply mode of the communication circuit 131A of the electric tool 100A, the voltage conversion circuit 132A is driven to convert a voltage BAT+ of the battery into the bus terminal voltage Vbus, thereby allowing the battery 110A to charge the connected device 800. The voltage BAT+ of the battery is different from the bus terminal voltage Vbus.

In the present disclosure, a circuit design of the charging and discharging control circuit 130A is added to the electric tool 100A to support the power adapter 900 from different suppliers. At the same time, the electric tool 100A can provide reverse power supply function.

Figure 6:
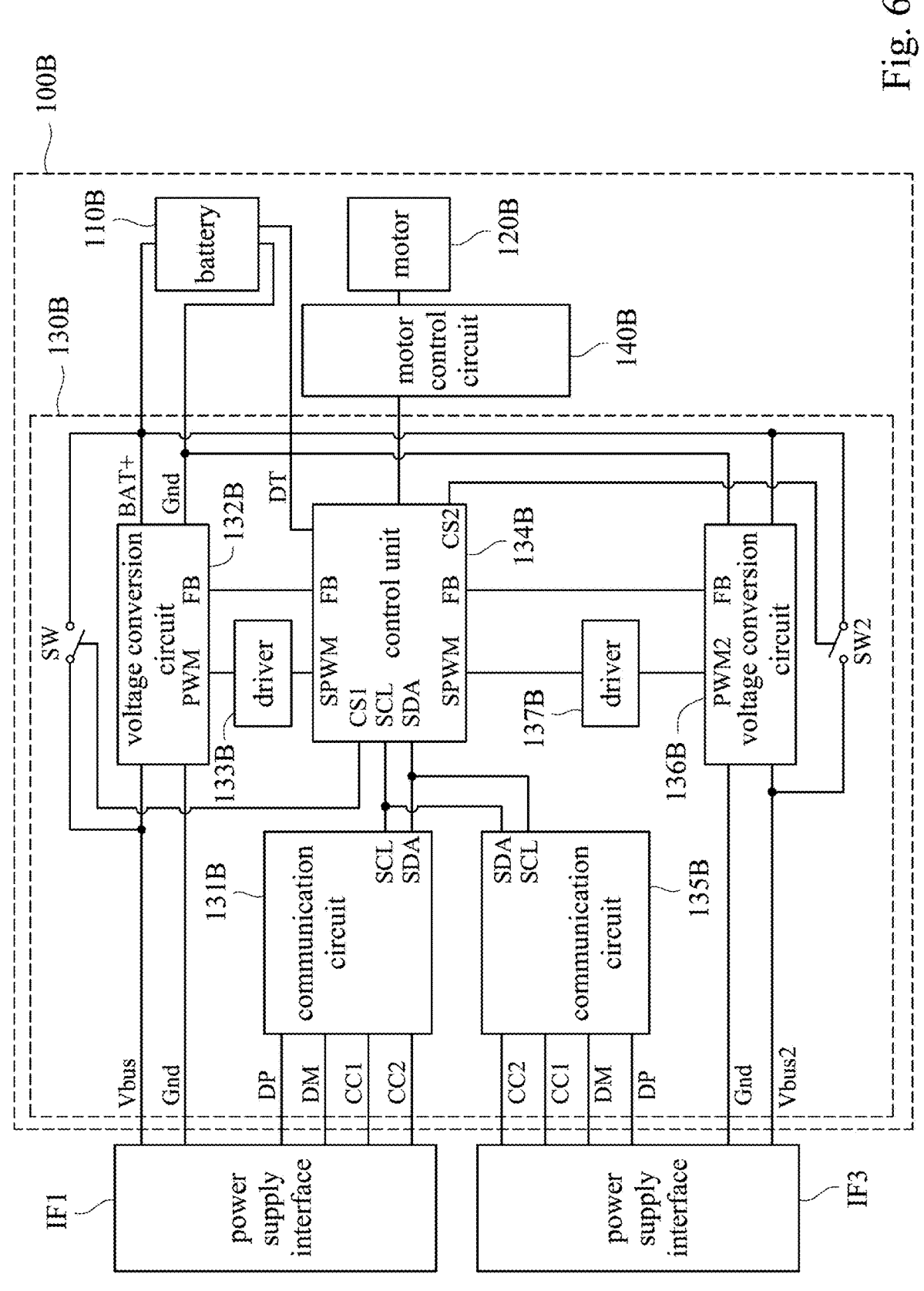
FIG. 6 depicts a schematic diagram of an internal circuit of an electric tool according to some embodiments of the present disclosure.

FIG. 6 depicts a schematic diagram of an internal circuit of an electric tool 100B in FIG. 1 according to some embodiments of the present disclosure. Compared with the electric tool 100A in FIG. 5, the electric tool 100B further adds another circuit of a DC-DC converter to support the power adapter 900 from different suppliers. At the same time, the electric tool 100B can provide reverse power supply function. Furthermore, the electric tool 100B can provide a multi-phase voltage function during power supply or charging.

The electric tool 100B includes a battery 110B, a motor 120B, a charging and discharging control circuit 130B and a motor control circuit 140B. The charging and discharging control circuit 130B includes a communication circuit 131B, a voltage conversion circuit 132B, a driver 133B, a control unit 134B and a switch SW. The battery 110B is coupled to the charging and discharging control circuit 130B. The motor control circuit 140B is coupled between the motor 120B and the charging and discharging control circuit 130B. Connection methods and operations of the battery 110B, the motor 120B, the charging and discharging control circuit 130B and the motor control circuit 140B are respectively similar to connection methods and operations of the corresponding components in the electric tool 100A in FIG. 5. For the sake of brevity, only the differences are described below.

Compared with the charging and discharging control circuit 130A in FIG. 5, the charging and discharging control circuit 130B further includes a communication circuit 135B, a voltage conversion circuit 136B, a driver 137B and a switch SW2. The communication circuit 135B is coupled to the second power adapter (not shown in the figure) through a power supply interface IF3, and is coupled to the control unit 134B. The voltage conversion circuit 136B is configured to receive a pulse width modulation signal PWM2 generated by the driver 137B to convert a lower bus terminal voltage Vbus2 of the output voltage of the second power adapter into the voltage of the battery 110B according to the pulse width modulation signal PWM2 through the voltage conversion path (i.e. the path that passes through the power supply interface IF3, the voltage conversion circuit 136B and the battery 110B). The driver 137B is configured to receive the modulation control signal SPWM, and is configured to generate the pulse width modulation signal PWM2 according to the modulation control signal SPWM. The switch SW2 is conducted or turned off according to a voltage level of the control signal CS2 of the control unit 134B.

The present disclosure uses a circuit design of two sets of DC-DC converters in the electric tool 100B, to support the power adapter 900 from different suppliers, or to accelerate a charging speed of a battery through two sets of power adapters. In addition, the electric tool 100B can provide reverse power supply function, and can provide power to more than one powered terminal device (not shown in the figure). Further, the electric tool 100B can also use multi-phase voltage to charge a battery through two sets of DC-DC converters, or provide multi-phase voltage (such as two-phase voltage, a phase difference between the two phases is 180°) to the powered terminal device (not shown in the figure).

Figure 7:
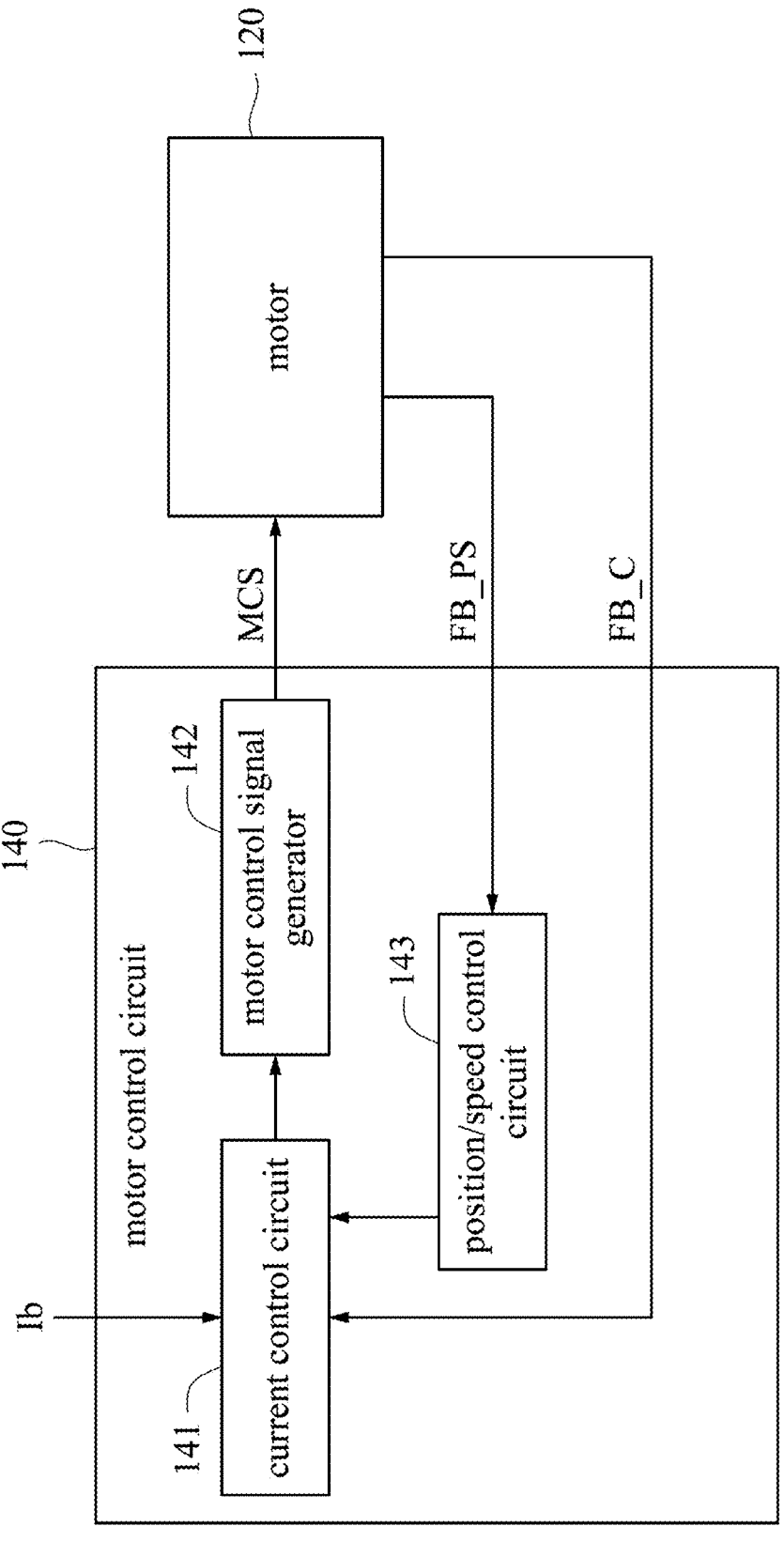
FIG. 7 depicts a schematic diagram of a motor control circuit of an electric tool according to some embodiments of the present disclosure.

FIG. 7 depicts a schematic diagram of a motor control circuit 140 of an electric tool 100 in FIG. 1 according to some embodiments of the present disclosure. The motor control circuit 140 includes a current control circuit 141, a motor control signal generator 142 and a position/speed control circuit 143.

The current control circuit 141 is coupled to the charging and discharging control circuit 130 in FIG. 1, and is configured to receive a current feedback signal FB_C of the motor 120. The motor control signal generator 142 is coupled between the current control circuit 141 and the motor 120, and is configured to generate a motor control signal MCS according to a driving signal generated by the current control circuit 141. The position/speed control circuit 143 is coupled between the current control circuit 141 and the motor 120, and is configured to receive a position/speed feedback signal FB_PS of the motor 120 to learn of a speed and/or a torque of the motor 120, and then estimate a position of a rotor. The current control circuit 141 is configured to generate the driving signal according to an upper limit of a load current Ib, the position/speed feedback signal FB_PS and the current feedback signal FB_C.

Please refer to FIG. 1 and FIG. 7, in one embodiment, the charging and discharging control circuit 130 is configured to detect an input current Iin from the power adapter 900 and a load current Ia flowing to the battery 110, and is configured to calculate the upper limit of the load current Ib that can be provided to the motor 120 according to a difference between the input current Iin and the load current Ia. The motor control circuit 140 is configured to control the speed or the torque of the motor 120 according to the upper limit of the load current Ib. In other words, this embodiment adjusts the speed or the torque of the motor 120 according to actual needs to support multiple charging/power supply modes. In another embodiment, the charging and discharging control circuit 130 is configured to detect that detect the input current Iin of the power adapter 900 and set the load current Ib supplied to the motor 120 to provide the load current Ia for charging the battery 110 according to the difference between the input current Iin and the load current Ib. In this embodiment, the charging and discharging control circuit 130 is configured to ensure that the motor 120 can operate normally and uses reaming current to charge the battery 110.

In one embodiment, the motor control circuit 140 in FIG. 7 can be implemented as a vector control circuit, also known as a field-oriented control (FOC) control circuit, using a space vector pulse width modulation (SVPWM) signal to control three-phase AC motors (e.g. the motor 120). By adjusting output frequency, value and angle of the output voltage of a variable-frequency drive, a magnetic field and a torque of the motor 120 are controlled, and the output of the motor 120 can be controlled.

In another embodiment, the motor control circuit 140 can include a six step square wave control circuit. The motor control circuit 140 is configured to control the switches of the three-phase full bridge through six different control signals so that a stator current of the motor 120 has six states, that is, synthetic magnetomotive force of a stator winding has six states.

Figure 8:
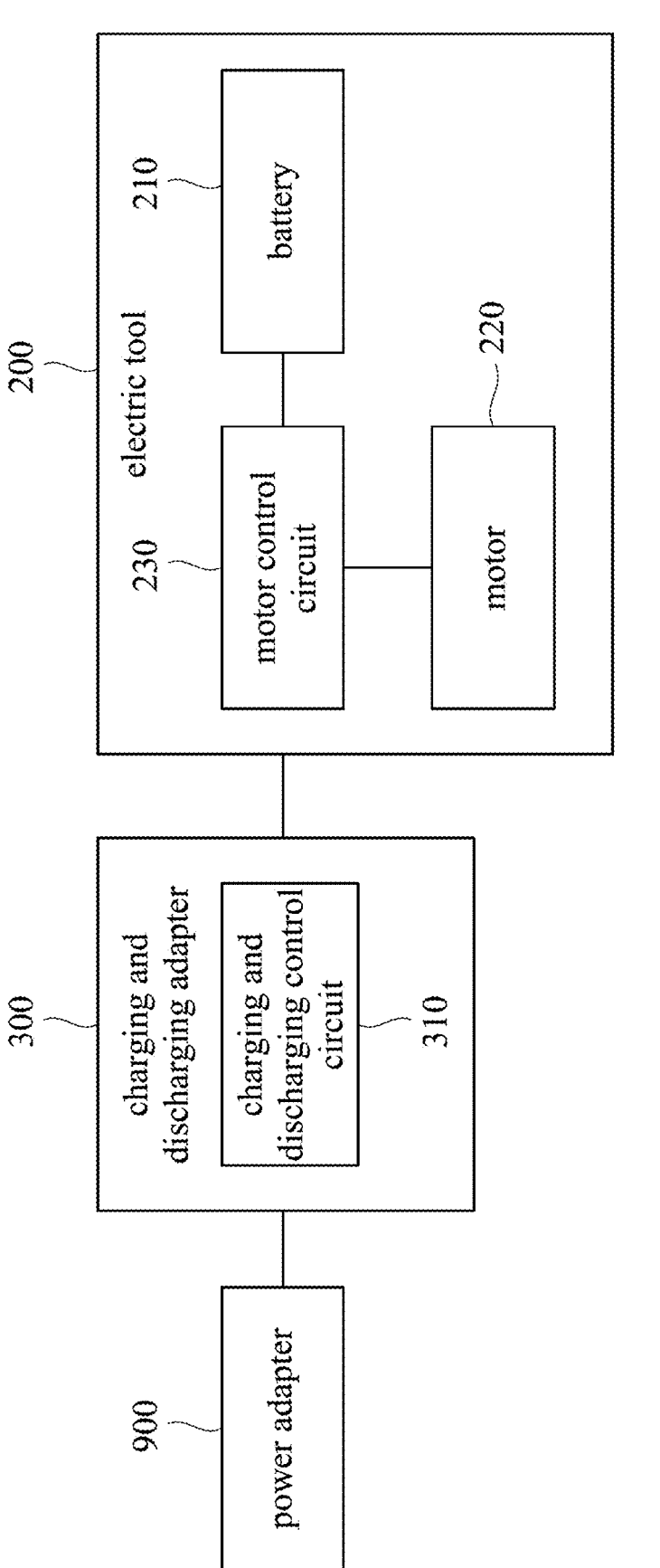
FIG. 8 depicts a schematic diagram of an electric tool and a power adapter according to some embodiments of the present disclosure.

The aforementioned division of each functional block is only to facilitate explanations of operations of each embodiment. In practice, each functional block can be combined or set separately according to different design considerations. For example, FIG. 8 depicts a schematic diagram of an electric tool 200, a charging and discharging adapter 300 and a power adapter 900 according to some embodiments of the present disclosure. The electric tool 200 is coupled to the power adapter 900 through the charging and discharging adapter 300. The electric tool 200 includes a battery 210, a motor 220 and a motor control circuit 230. The charging and discharging adapter 300 includes a charging and discharging control circuit 310. In some embodiments, please refer to FIG. 1 and FIG. 8, the electric tool 100 in FIG. 1 can be designed with a charging and discharging control circuit (e.g. charging and discharging control circuit 310 of the charging and discharging adapter 300) installed outside the electric tool 200 according to actual needs. For example, the charging and discharging adapter 300 can be implemented as a base for accommodating the electric tool 200, and is coupled between the power adapter 900 and the electric tool 200 to perform aforementioned functions of the charging and discharging control circuit 310. At this time, the charging and discharging adapter 300 includes a shape as a charging stand (not shown in the figure) and can be pluggably connected to the electric tool 200 or the power adapter 900. In this embodiment, the battery 210 is fixedly installed in the electric tool 200. In another embodiment, the electric tool 200 does not include the battery 210, and the battery 210 is electrically connected to the electric tool 200 in a detachable manner.

Figure 9:
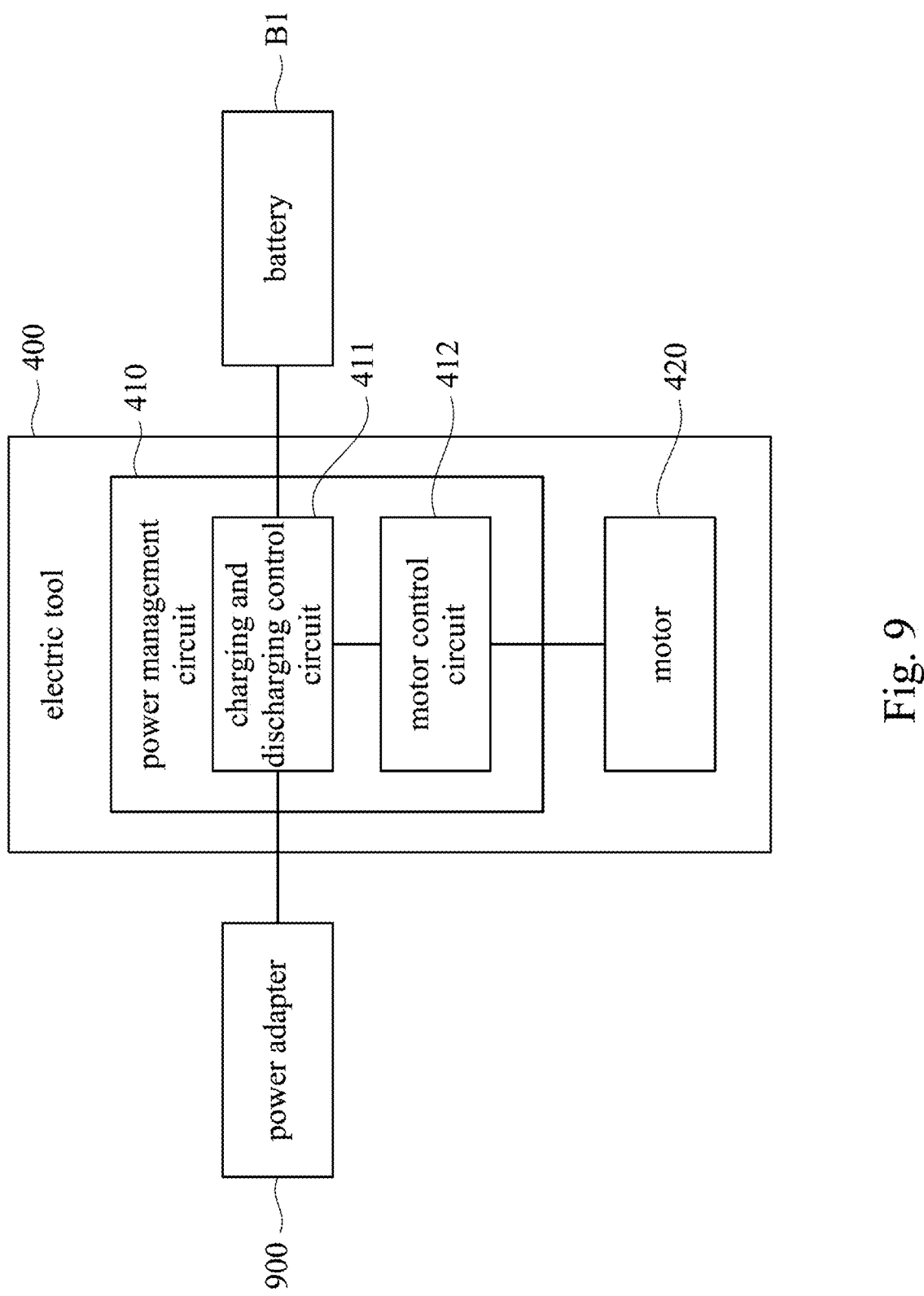
FIG. 9 depicts a schematic diagram of an electric tool and a power adapter according to some embodiments of the present disclosure.

FIG. 9 depicts a schematic diagram of an electric tool 400, a battery B1 and a power adapter 900 according to some embodiments of the present disclosure. The battery B1 and the electric tool 400 are electrically connected in a detachable manner, and the electric tool 400 is coupled between the battery B1 and the power adapter 900. The electric tool 400 includes a power management circuit 410 and a motor 420. The power management circuit 410 includes a charging and discharging control circuit 411 and a motor control circuit 412. In some embodiments, please refer to FIG. 1, FIG. 8 and FIG. 9, the electric tool 100 in FIG. 1 or the electric tool 200 in FIG. 8 can integrate the charging and discharging control circuit (e.g. the charging and discharging control circuit 411 in FIG. 9) and the motor control circuit (e.g. the motor control circuit 412 in FIG. 9) into a power management circuit (e.g. the power management circuit 410 in FIG. 9) according to actual needs. At this time, through various functions and the design of the electric tool 400 in the aforementioned paragraphs, the battery B1 of other different devices (such as a mobile device) can be charged or provide power.

In one embodiment, the battery B1 can be designed to be fixedly installed in the electric tool 400.

Figure 10:
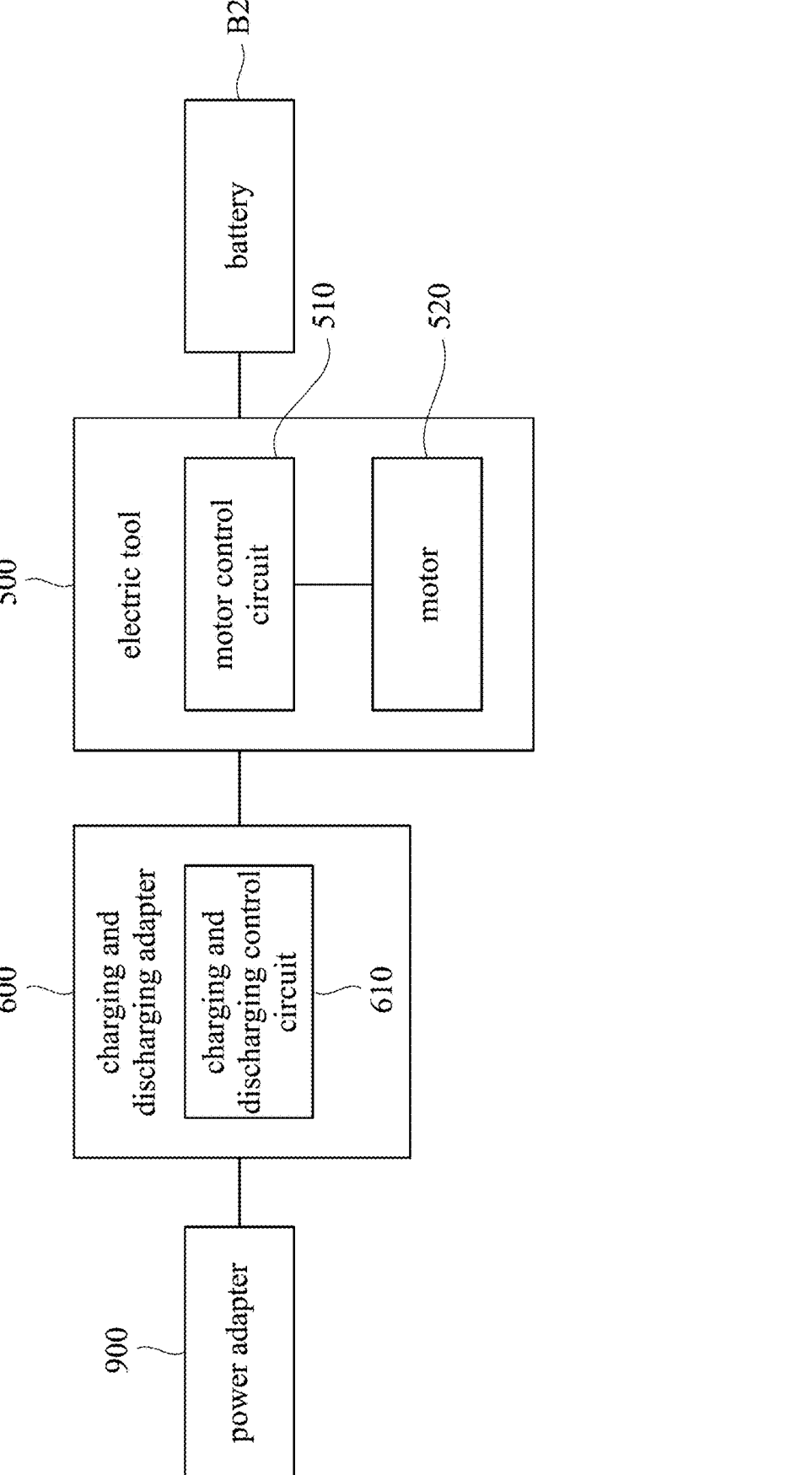
FIG. 10 depicts a schematic diagram of an electric tool and a power adapter according to some embodiments of the present disclosure.

FIG. 10 depicts a schematic diagram of an electric tool 500 and the power adapter 900 according to some embodiments of the present disclosure. A battery B2 and an electric tool 500 are electrically connected in a detachable manner, and the electric tool 500 is coupled between the battery B2 and a charging and discharging adapter 600. The charging and discharging adapter 600 is further connected to the power adapter 900. The electric tool 500 includes a motor control circuit 510 and a motor 520. The charging and discharging adapter 600 includes a charging and discharging control circuit 610. In some embodiments, please refer to FIG. 1, FIG. 8 and FIG. 10, compared with the electric tool 200 in FIG. 8, the design of the electric tool 500 in FIG. 10 can be further added a design concept of the embodiment in FIG. 9, to make the connection methods and charging/power supply functions of the charging and discharging control circuit 610 more diverse.

In one embodiment, the battery B2 can be designed to be fixedly installed in the electric tool 500.

It is further explained that architectures of embodiment in FIG. 8 to FIG. 10 are only examples to illustrate some possible ways of integrating and separately setting the functional blocks in the foregoing embodiments, and the present disclosure is not limited thereto. It will be understood by those of ordinary skill in the art that various modifications and applications may be made without departing from essential characteristics of the aspects. For example, the elements described in detail in the above aspects may be modified. In addition, differences related to these modifications and applications should be construed as being covered by the scope of the invention as defined by the following claims.

Based on the aforementioned embodiments, the present disclosure provides a design of an electric tool and a power management circuit, which allows electronic products to be quickly charged with a specific power adapter, allows electronic products to be used when a power adapter is connected to electronic products, and internal data of electronic products can be directly read through a port of a connector.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An electric tool powered by a battery, comprising:
a motor;
a charging and discharging control circuit, comprising a direct power supply path to connect a power adapter and the battery, wherein the charging and discharging control circuit is configured to detect an input current from the power adapter and a first load current flowing to the battery, and calculate an upper limit of a second load current that can be provided to the motor according to a difference between the input current and the first load current; and
a motor control circuit, coupled between the charging and discharging control circuit and the motor, wherein the motor control circuit is configured to control a speed or a torque of the motor according to the upper limit of the second load current, wherein the charging and discharging control circuit comprises:
a switch, coupled between the power adapter and the battery; and
a control unit, coupled to the power adapter, the switch and the motor control circuit, wherein the control unit is configured to detect a voltage of the battery to generate a control signal to the power adapter so as to control the power adapter to generate a first output voltage greater than the voltage of the battery, and to control the switch to conduct the direct power supply path, wherein the control unit is further configured to determine whether the first load current reaches a first preset current, wherein when the first load current reaches a first preset current, the control unit is configured to notify the power adapter to stop adjusting the first output voltage, wherein when the first load current does not reach the first preset current, the control unit is configured to notify power adapter so as to increase the first output voltage to a second output voltage according to the voltage of the battery.

2. The electric tool of claim 1, wherein the control unit is further configured to determine whether the voltage of the battery reaches a full charging voltage due to the first output voltage, wherein when the voltage of the battery does not reach the full charging voltage due to the first output voltage, the control unit is further configured to determine whether the first load current drops below a second preset current, wherein when the first load current drops below the second preset current, the control unit is further configured to notify the power adapter so as to adjust the first output voltage to the second output voltage according to the voltage of the battery.

3. The electric tool of claim 2, wherein when the voltage of the battery reaches the full charging voltage due to the first output voltage, the control unit is further configured to control the switch to interrupt the direct power supply path.

4. The electric tool of claim 1, wherein the motor control circuit comprises:

a current control circuit, coupled to the charging and discharging control circuit and configured to receive a current feedback signal of the motor;

a motor control signal generator, coupled between the current control circuit and the motor and configured to generate a motor control signal according to a driving signal; and a position/speed control circuit, coupled between the current control circuit and the motor and configured to receive a position/speed feedback signal of the motor to obtain the speed or the torque of the motor, wherein the current control circuit is configured to generate the driving signal according to the upper limit of the second load current, position/speed feedback signal and the current feedback signal.

5. A power management circuit, configured to supply power to a motor and a battery in an electric tool, comprising:

a charging and discharging control circuit, configured to couple to a power adapter and the electric tool, comprising a direct power supply path to the power adapter and the battery, wherein the charging and discharging control circuit is configured to detect an input current from the power adapter and a first load current flowing to the battery, and calculate an upper limit of a second load current that can be provided to the motor according to a difference between the input current and the first load current;

wherein the charging and discharging control circuit is configured to transmit the upper limit of the second load current to a motor control circuit of the electric tool so that the motor control circuit is further configured to control a speed or a torque of the motor according to the upper limit of the second load current, wherein the charging and discharging control circuit comprises:

a switch, coupled between the power adapter and the battery of the electric tool; and a control unit, coupled to the power adapter, the switch and the motor control circuit of the electric tool, wherein the control unit is configured to detect a voltage of the battery to generate a control signal to the power adapter, so as to control the power adapter to generate a first output voltage greater than the voltage of the battery, and to control the switch to conduct the direct power supply path, wherein the control unit is further configured to determine whether the first load current reaches a first preset current, wherein when the first load current reaches a first preset current, the control unit is configured to notify the power adapter to stop adjusting the first output voltage, wherein when the first load current does not reach the first preset current, the control unit is configured to notify power adapter so as to increase the first output voltage to a second output voltage according to the voltage of the battery.

6. The power management circuit of claim 5, wherein the control unit is further configured to determine whether the voltage of the battery reaches a full charging voltage due to the first output voltage, wherein when the voltage of the battery does not reach the full charging voltage due to the first output voltage, the control unit is further configured to determine whether the first load current drops below a second preset current, wherein when the first load current drops below the second preset current, the control unit is further configured to notify the power adapter to adjust the first output voltage to the second output voltage according to the voltage of the battery.

7. The power management circuit of claim 6, wherein when the voltage of the battery reaches the full charging voltage due to the first output voltage, the control unit is further configured to control the switch to interrupt the direct power supply path.

8. An electric tool powered by a battery, comprising:
a motor;
a charging and discharging control circuit, comprising a direct power supply path to connect a power adapter and the battery, wherein the charging and discharging control circuit is configured to detect an input current from the power adapter and a first load current flowing to the battery, and calculate an upper limit of a second load current that can be provided to the motor according to a difference between the input current and the first load current; and
a motor control circuit, coupled between the charging and discharging control circuit and the motor, wherein the motor control circuit is configured to control a speed or a torque of the motor according to the upper limit of the second load current, wherein the charging and discharging control circuit further comprises:
a switch, coupled between the power adapter and the battery;
a communication circuit, configured to detect whether the power adapter is connected to receive a first communication signal so as to convert the first communication signal into a second communication signal;
a voltage conversion circuit, coupled between the power adapter and the battery, wherein the voltage conversion circuit is configured to receive a pulse width modulation signal to adjust an output voltage of the power adapter to the voltage of the battery through a voltage conversion path according to the pulse width modulation signal;
a driver, coupled to the voltage conversion circuit, and configured to receive a modulation control signal to generate the pulse width modulation signal according to the modulation control signal; and
a control unit, coupled to the driver and the communication circuit, wherein the control unit is configured to detect a voltage of the battery to generate a control signal to the power adapter so as to control the power adapter to generate a first output voltage greater than the voltage of the battery, and to control the switch to conduct the direct power supply path, wherein the control unit is configured to generate the modulation control signal according to the second communication signal of the communication circuit and the voltage of the battery.

9. The electric tool of claim 8, wherein when the power adapter is connected to the electric tool, the communication circuit is further configured to notify the control unit through the second communication signal to determine whether the power adapter supports the direct power supply path or the voltage conversion path.

* * * * *